Sept. 7, 1937.  H. E. RINGER  2,092,184

DUMMY SAWYER

Filed July 10, 1936

Inventor

Harry E. Ringer

Patented Sept. 7, 1937

2,092,184

UNITED STATES PATENT OFFICE 2,092,184

DUMMY SAWYER

Harry E. Ringer, Rathrum, Idaho

Application July 10, 1936, Serial No. 89,902

2 Claims. (Cl. 143—163)

This invention relates to a dummy sawyer and has for its object to provide feeding and supporting means for a saw which will greatly facilitate the cutting or felling of timber by a single person.

A further object of the invention is to provide guiding means for the free end of the saw which will steady the movement of the saw when in operation and yet will not hamper the normal working movement of the saw.

Another object is to provide a device of the above-mentioned character which is simple and durable in construction, reliable and efficient in operation and inexpensive to manufacture.

Other objects and advantages of the invention will be apparent during the course of the following description.

Figure 1:
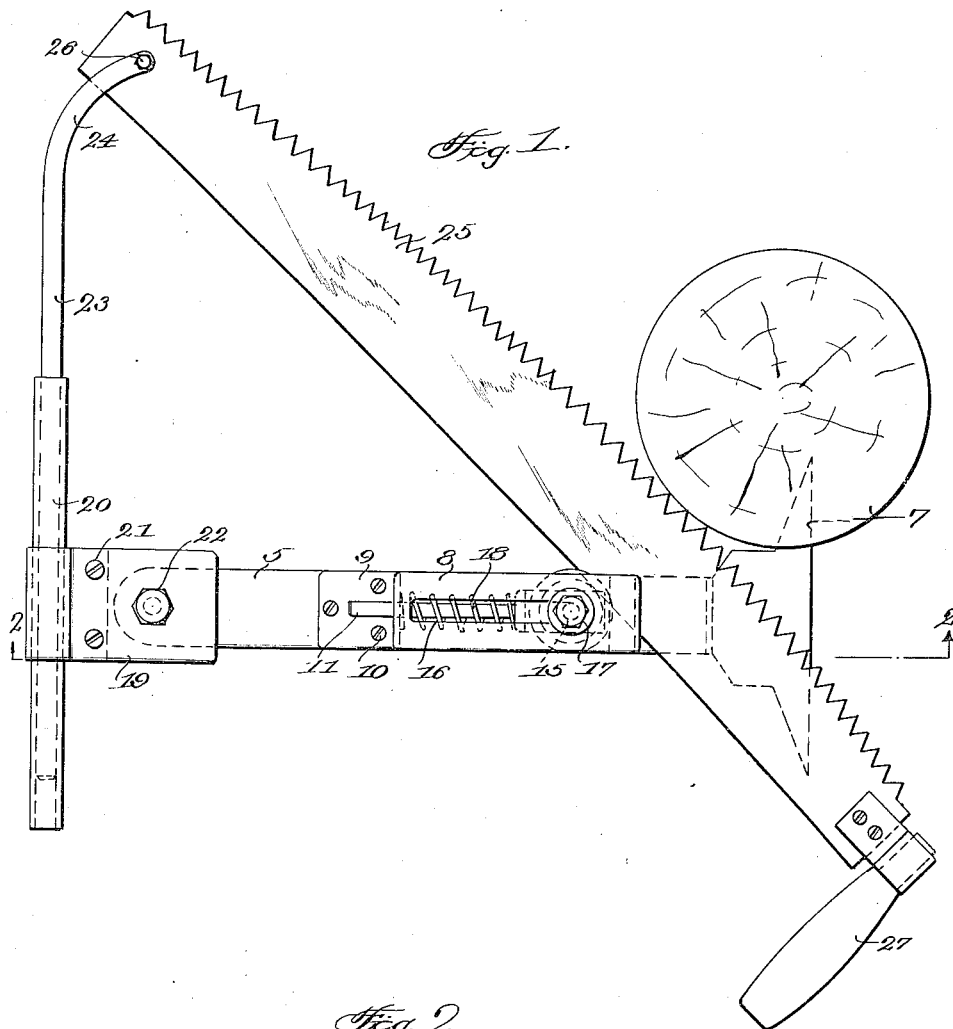
Figure 2:
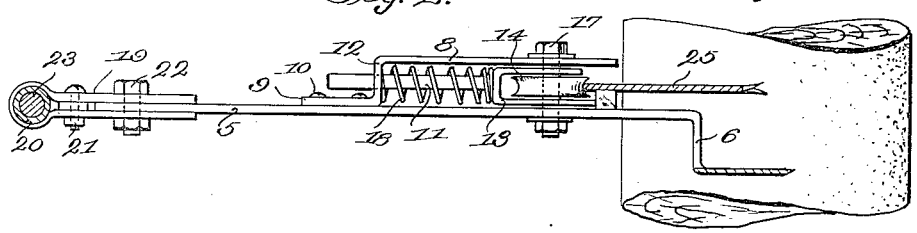

In the accompanying drawing, forming a part of this specification and in which like numerals are employed to designate like parts throughout the same, Fig. 1 is a top plan view of the device in operative position, and, Fig. 2 is a side elevation view of the same.

In the drawing, wherein for the purpose of illustration I have shown a preferred embodiment of my invention, the numeral 5 denotes a flat metal bar having one of its ends off-set, as at 6, and provided with laterally projecting pick points 7, adapted to be driven into the side of the timber to be cut, whereby the bar 5 is supported in a horizontal plane at right angles to the axis of the timber, as clearly shown in Fig. 2. A bracket plate 8 extends longitudinally of one side of the bar 5 in spaced parallel relation thereto, having its outer end 9 off-set inwardly and fixedly attached to the bar by screws 10. A rod 11 is slidably mounted through an aperture in the vertical wall 12 of the bracket plate having a bifurcated end 13 disposed between the plate 8 and bar 5 to receive the feed wheel 14 journaled on the axle 15 extending transversely through the wheel and bifurcated end. The ends of the axle project through longitudinal slots 16 formed in the plate 8 and bar 5 having nuts 17 threaded thereon which hold the axle in place but permit free longitudinal movement of the feed wheel. A coil spring 18 is mounted on the rod 11 between the wall 12 of the plate 8 and the bifurcated end 13 of the rod which normally urges the feed wheel towards the inner end of the bar 5. A clamping plate 19 bent around a tubular member 20 is adjustably secured in fixed relation to the tubular member by bolts 21 and the free ends of the clamping plate straddle the outer end of the bar 5, being pivotally connected thereto by a pivot bolt 22. A guide rod 23 is slidably fitted in the tubular member having one end slightly curved, as at 24 and bifurcated to receive the free end of the saw 25, to which it is pivotally connected by a bolt 26. The straight edge of the saw 25 rests on the feed wheel 14 and the saw is reciprocated back and forth by the handle 27.

In use the dummy sawyer may be employed in performing various sawing operations either in cutting fallen timber or felling trees. In the position shown in Fig. 1, the saw is constantly moved towards the timber being cut by the feed wheel 14 which is under the tension of spring 18 and at the same time permits free and easy reciprocation of the saw. The free end of the saw is guided by the guide rod 23 which is pivotally and slidably mounted to permit free working movement of the saw when in operation.

It is to be understood that the form of my invention herewith shown and described is to be taken as a preferred example of the same and that certain changes in the shape, size and arrangement of the parts may be made without departing from the spirit of the invention or the scope of the subjoined claims.

Having thus described my invention, I claim:—

1. A dummy sawyer comprising a supporting bar having means at one end for attaching said bar to a timber to be cut, a clamp pivotally connected to the outer end of said bar, a tubular member adjustably mounted in said clamp and extending laterally therefrom, a guide rod freely slidable in said tubular member, a saw having one end pivotally connected to one end of said guide rod and a spring actuated feed wheel mounted on said bar for supporting and feeding said saw when in operation.

2. A dummy sawyer comprising a supporting bar having an offset end provided with laterally projecting pick points for attaching said bar to a timber to be cut, a clamp pivotally connected to the outer end of said bar, a sleeve adjustably supported by said clamp and extending laterally therefrom, a guide rod freely slidable in said sleeve having one end curved and bifurcated, a saw having one end pivotally mounted in the bifurcated end of said guide rod, a bracket plate attached to the top of said bar in spaced relation thereto and a spring actuated feed wheel slidably mounted between said bracket plate and said bar, said feed wheel being adapted to bear against the straight edge of said saw and act as a fulcrum for the saw when reciprocated.

HARRY E. RINGER.